PILOT NETWORK SELECTION SYSTEMS

Filed Feb. 18, 1964 9 Sheets-Sheet 1

Inventors:
H. BENMUSSA
S. KOBUS

By Phillip A. Weiss
Attorney

Aug. 15, 1967 H. BENMUSSA ETAL 3,336,443

PILOT NETWORK SELECTION SYSTEMS

Filed Feb. 18, 1964 9 Sheets-Sheet 2

Inventors:
H. BENMUSSA
S. KOBUS

By [signature]
Attorney

Inventors:
H. BENMUSSA
S. KOBUS
By Phillip A. Weiss
Attorney

Inventor
H. BENMUSSA
S. KOBUS
By [signature]
Attorney

Inventors:
H. BENMUSSA
S. KOBUS
By Phillip A. Weiss
Attorney

Inventors:
H. BENMUSSA
S. KOBUS
By [signature]
Attorney

Inventors:
H. BENMUSSA
S. KOBUS
By [signature]
Attorney

Inventors:
H. BENMUSSA
S. KOBUS
By [signature]
Attorney

Inventors:
H. BENMUSSA
S. KOBUS
By [signature]
Attorney

United States Patent Office 3,336,443

Patented Aug. 15, 1967

3,336,443

PILOT NETWORK SELECTION SYSTEMS

Henri Benmussa, Meudon, and Stanislas Kobus, Paris, France, assignors to International Standard Electric Corporation, New York, N.Y., a corporation of Delaware Filed Feb. 18, 1964, Ser. No. 345,661
7 Claims. (Cl. 179—22)

ABSTRACT OF THE DISCLOSURE

An electronic pilot network for selecting routing paths through multi-switch networks. Current is placed on each inlet of the pilot network. If current is received at the outlet, one-half of the pilot network is blocked. If current is still received at the outlet, one-half of the remaining pilot network is blocked etc. until only one through path remains. If no current is received at any point the other half of the network is blocked while the first one-half is unblocked. The blocking and unblocking is controlled by a decoding matrix.

The present invention relates to a selection system for circuits or electrical equipment specially applicable to automatic telephone exchanges.

In these systems, switching apparatus are used in order to find a circuit or unit which responds to determined conditions. For instance, there are finders for choosing a calling circuit, pre-selectors for designating a free circuit, selectors for routing the call onto a free circuit in the numbered direction. Such switching apparatus can be made up of rotating elements, of relays, of crossbar multiswitches, or, of electronic scanners. Often they operate by means of the "step-by-step" process, inasmuch as they scan in succession all the circuits from starting point up to obtaining the required result. Such a process is normally considered incompatible with high speed operation.

Accordingly, an object of this invention is to promote selection systems compatible with high speed operation.

Another object of the present invention is to provide rapid switching units operating logarithmically.

A related object of the invention is to provide a device for rapidly finding individual units. Such a device may comprise a de-coding matrix, a source of marking potential A, a source of inhibit potential B and a test circuit. In a first stage, potential A is sent onto one side of all the horizontals, potential B remaining unused. Thus, potential A, because of this fact, is retransmitted onto the other side of all the horizontals $z$ and simultaneously marks all the individual units. In a second stage, potential B is sent onto one or several verticals so as to cancel the effect of A upon some horizontals, which cancels part of the units. In a third stage the testing is performed on the units which remain in circuit, by then switching—if necessary—the potential B of some verticals onto others, so as to put back into service the cancelled units; and to cancel the others if the test is negative. In the next stages the selection is carried on according to the same process until only a single unit remains in service. It should be understood that the respective functions of the horizontals and of the verticals are able to be permuted.

According to another related object of the invention, decoding matrices for binary codes are used. When the second phase of operations takes place, the inhibit potential B is applied onto one of the verticals so that cancelling is effected of all the individual units whose numbers comprise a same figure in the last rank; that is, one unit out of two. The same process will then repeat itself for the figures of the next ranks by cancelling half of the units every time.

According to a feature of the invention, during the first phase of operations, the potential A is applied onto all the horizontals and all the verticals, so as to mark all the outlets of the matrice. During the second phase, the potential A is immediately cancelled from one of the pairs of verticals in order to replace it by the potentials A and B provided by a bi-stable circuit. This amounts to cancelling one unit out of two. Thus, an object of the invention is to provide means for reversing the position of the bi-stable unit if the test is negative. The same process repeats itself during the next phases by using a new bi-stable at each phase, the number of the chosen unit finally being read on the bi-stables.

Another object of the invention is to provide a binary counter at each phase. The position of this counter is copied on the bi-stable corresponding to this phase; so that if the test is negative it is just necessary to send an impulse onto the counter in order to reverse its position, and subsequently that of the bistable.

Another feature of the invention is to use a ground as potential A to block a PNP transistor with emitter connected to ground; and for potential B a negative polarity which cancels the effect of A by saturating the transistor. The transistor acting then upon a second transistor which marks or eliminates the corresponding individual unit.

Another object of the invention is to provide two matrices, an individual unit being designated only if it is simultaneously marked by the two matrices. This arrangement enables the system to scan $mxn$ units with two matrices having, respectively, $m$ and $n$ outlets.

Another feature of the invention is to prohibit the choosing of certain individual units by placing the inhibit potential B on all or part of the horizontals.

The rapid finding device, defined in the foregoing objects and features can have its application in the pilot network of semi-electronic telephone systems. An analoguous network has been disclosed in U.S. Patent No. 3,226,486. The invention proposes to bring to such pilot networks a number of improvements aimed at increasing the speed of the selection, at simplifying the wiring, and, at avoiding the indefinite immobilization of the selectors.

Another object of the invention is to provide a telephone system made up of a connection network and of a pilot network. The connection network comprising arrangements of selectors of "sections" and not more than one link between two sections belonging to two consecutive stages. The pilot network presenting a configuration identical to the one of the connection network, and comprising, subsequently, an amplifier for simulating each section and a link with a gate for simulating each link of the connection network. This gate is or is not conductive according to the condition of the corresponding selector (free or busy). The pilot current transmitted from one of the ends of the network is received for test purposes, either at the other end of the network or at the outlets of the amplifiers of any stage whatsoever.

Another object of the invention is to provide a first gate by placing on the links a diode in series with a contact assoicated with the selector, the pilot current is then by-passed via the diode and the closed contact if the corresponding selector is busy.

Another object of the invention is to provide on the links associated with the primary selectors, a second gate rendered conductive only when it is required to mark the direction corresponding to the said selector, and to multiple upon a same common point all the links corresponding to the selectors of same rank, each point characterizing thus a rank of selectors.

Another object of the invention is to place, at every outgoing terminal section amplifier, yet another gate that is rendered conductive only if it is required to mark the said section.

Another feature of the invention is to associate with the piloting network several rapid finding devices with at least one for scanning the different common end points of the primary sections, and to transmit the pilot current onto these points; at least another one for scanning the amplifiers of the primary sections by unblocking them; and at least another one for scanning the amplifiers of the secondary sections, and so on.

According to another feature of the invention, in a first phase of operation, the various scanners are positioned upon all the outlets at the same time, the pilot current omitted through the first scanner being transmitted through all the routing paths available between the two marked ends. In the second phase, the terminal section amplifiers are successively eliminated by checking at each test the presence of the piloting current at the output of these amplifiers, so as to choose a terminal section. In the third phase, the choice is made of a tertiary section in the same way, by effecting the test at the output of the terminal amplifier chosen. In the fourth phase, the choice is made of a secondary section by effecting the test at the output of the tertiary amplifier chosen. The same process is repeated as the pilot current nearer and nearer to the other end of the circuit, so that each test uses only the propagation time of the piloting current through a link between two consecutive stages.

According to another object of the invention, only one pilot network is provided; but, for reliability purposes, the set of scanners is doubled so that any pilot amplifier is checked by two different scanners. In order that the two scanners may operate without hindering each other, there are provided, between the two amplifying stages, two distinct links with gates respectively controlled by the two scanners. Each one of these latter is thus able to unblock the amplifier.

A related feature of the invention is in the case where use is made of scanners with two matrices, to insert upon each inter-stage link of the amplifier, two gates placed respectively under the control of the two matrices; the link being conductive only when the two gates are designated at the same time by both matrices.

Another feature of the invention is to prohibit, to the tertiary scanner, the choice of the all or part of tertiary sections having access to none-marked terminal sections so as to simplify the operation of the terminal scanner by limiting its search field. This feature enables the use of less cumbersome and less costly terminal scanners.

In accordance with one aspect of this invention a first test is performed on all circuits to see if there is at least a single one that meets the required conditions. If the first test results are affirmative, a second test is performed on part of the entire circuitry by cancelling the other part. If the result of this second test is positive, the field remaining to be scanned is again further reduced. If the result of the second test is negative, the cancelled circuitry is again tested, and the other part of circuitry is put out of service. The same process goes on until one circuit, and one only, has been selected. It is possible, for instance, to cancel a half of the entire circuitry, then a half of the remaining half, and so on. An apparatus performing such operations will, in the present specification, be designated as a "binary exclusion device." It enables the system to effect a choice among 2*n* circuits by accomplishing *n* operations, which represents an appreciable gain of time as compared to the so called "step-by-step" system. Extremely fast operation is obtained by using an electronic scanner.

This device in fact finds its application in the semi-electronic telephone system disclosed in the undermentioned United States Patents assigned to the assignee of this invention.

| Patent No.: | Issued on |
|---|---|
| 3,242,265 | Mar. 22, 1966 |
| 3,270,139 | Aug. 8, 1966 |
| 3,249,698 | May 3, 1966 |

According to a preferred embodiment of the inventive system a call established between two subscribers or units linked directly to the same central exchange, uses: a calling subscriber station, a first selection chain, a local junctor or feeder, a second selection chain, and a called subscriber station.

Each one of the two selection chains in one embodiment of the invention uses crossbar multiswitches which afford excellent quality in transmission and are economical. The control and checking circuits, on the other hand, are made up of electronic apparatus such as diodes and transistors operating in a practically instantaneous manner. In order to establish a connection both ends of the selection chain are marked at the various units liable to be put into communication. In the case of the first selection chain, the calling party is marked at one end and all the available feeders are marked at the other end. In the case of the second chain, the one or several lines of the called party are marked at one end, and the feeder that is seized by the calling party is marked at the other end. In order to determine one routing path and one only between both ends thus marked, among all the available paths inside each one of these two selection chains, a by-path network or "pilot network" is used, the configuration of which is identical to that of the connection network. From the units marked at one of the ends, a signal is sent onto the circuits marked at the other end, and via all the available paths. In the first selection stage, the path sections are then blocked progressively until only one path is left. In order to accelerate the operation, a logarithmic process is adopted. Part of the path sections are blocked, a half of the entire lot for instance, then part of the remaining path sections are blocked, and so on, but means are provided that in the case where the signal is no longer received at the other end of the piloting network, the path sections previously blocked will be put back into service again. The selection being performed, in succession, inside all the stages; as per a similar process. The different elements of the routing path are thus determined and the multiswitches are acted upon in order to establish the connection simultaneously inside all the stages, to save time. The connecting magnets then hold by remanence, which enables the realization of an important economy in current consumption.

To release the connecting magnets, a de-magnetizing current must be sent to the connecting magnets and therefore their identity has to be known. Arrangements are provided to find again the different elements used in some determined connection.

In the case of outgoing calls, only one selection chain is used to connect the calling subscriber onto the outgoing junctor associated with the interautomatic circuit. Likewise, in the case of incoming calls, only one chain is used to connect the called party onto the circuit incoming junctor.

It is quite evident that the inventive switching unit enables the system to perform a rapid selection among the various available path sections. In the case where electronic components are used, the total duration for the selection of a routing path is in the order of a few milliseconds.

The present invention makes use of, among other elements, decoding matrices of a well known and currently used type. These matrices are made up of a grid of horizontal and vertical conductors (called in short "horizontals and verticals") which comprise, at certain crossing points, linking elements such as resistors or diodes. They receive coded information on the verticals and retransmit a decoded indication on the horizontals. The respective functions of the horizontals and of the verticals can, of course, be permuted. The operating principle of such matrices is simple; upon one of the side of all the horizontals a marking potential A is sent, and it is only transmitted onto the other side if its effect is not cancelled by an inhibit potential B applied onto certain verticals via the linking elements. The arrangement of the linking elements is such that, for every code, the potential A appears only upon one determined horizontal.

Other objects and features of the invention will become apparent from the description that follows, given by way of nonlimitative example, in conjunction with the accompanying drawings comprising FIGURES 1 to 11, wherein.

*Symbols.*—The bi-stable circuits such as *b*Y0 (FIGURE 1), are represented on the drawings by two juxtaposed rectangles. The incoming wires *b*0Y0 and *b*1Y0 are placed at the upper part; the outgoing wires $\overline{b\mathrm{Y0}}$ and *b*ẎO are placed at the lower part. When this bi-stable happens to be in position 0, the wires $\overline{b\mathrm{YO}}$ is at −12 v. potential and the wire *b*ẎO is connected to ground. In order to make this bi-stable pass onto position 1, a negative potential is sent along incoming wire *b*1YO; the wire *b*YO passes then onto −12 v. potential, the wire $\overline{b\mathrm{YO}}$ being connected to ground. To restore the bi-stable to its initial position, a negative potential is sent along incoming wire *b*0Y0. A similar representation is used for the other bi-stable circuits.

The binary counter *b*C has been represented by two juxtaposed rectangles having two diagonals. The incoming wire *byr* of the counter is placed on its left; the outgoing wires *b*C and *b*Ċ are placed at the lower part. When this counter happens to be in position 0, the wire $\overline{b\mathrm{C}}$ is at −12 v. potential and the wire *b*Ċ is connected to ground. In order to make this counter step to position 1, a transition −12 v. ground is sent along the incoming wire; the wire *b*Ċ passes then onto the −12 v. potential, the wire $\overline{b\mathrm{C}}$ being grounded. If a new transition, −12 v. ground is sent along the incoming wire, the counter makes another step and will then restore to position 0—, since it happens to be a binary counter having only two positions.

The black dot placed on the right of the triggers (bi-stables) and on the right of the binary counters, indicates that those are rapid units, that is to say, operating in a fraction of a microsecond. Thus, the entire logic circuit operates within a few microseconds.

The diodes placed at the crosspoints of the horizontal and vertical conductors have been represented symbolically by a small oblique stroke with a dot at its end. The forward direction of the diode is directed towards that dot.

When several components or units fill a similar function, only one is represented; but a number in brackets is provided in order to indicate the quantity. The same applies to the wires. Thus, for instance, there are four wires *bym*0 . . . *bym*3 (FIGURE 3) and four transistors B*tym*0 . . . *b*T*ym*3.

The electronic scanners, such as EXA (FIGURE 9), are represented by triangles. The circles of smaller size, having a dot (*pt* for instance) correspond to "AND" gates.

Finally, the mixed lines (FIGURES 1 to 4) mark the separation between units; the intersections which exist between the circuits and these mixed lines correspond to the outgoing points.

Figure 3:
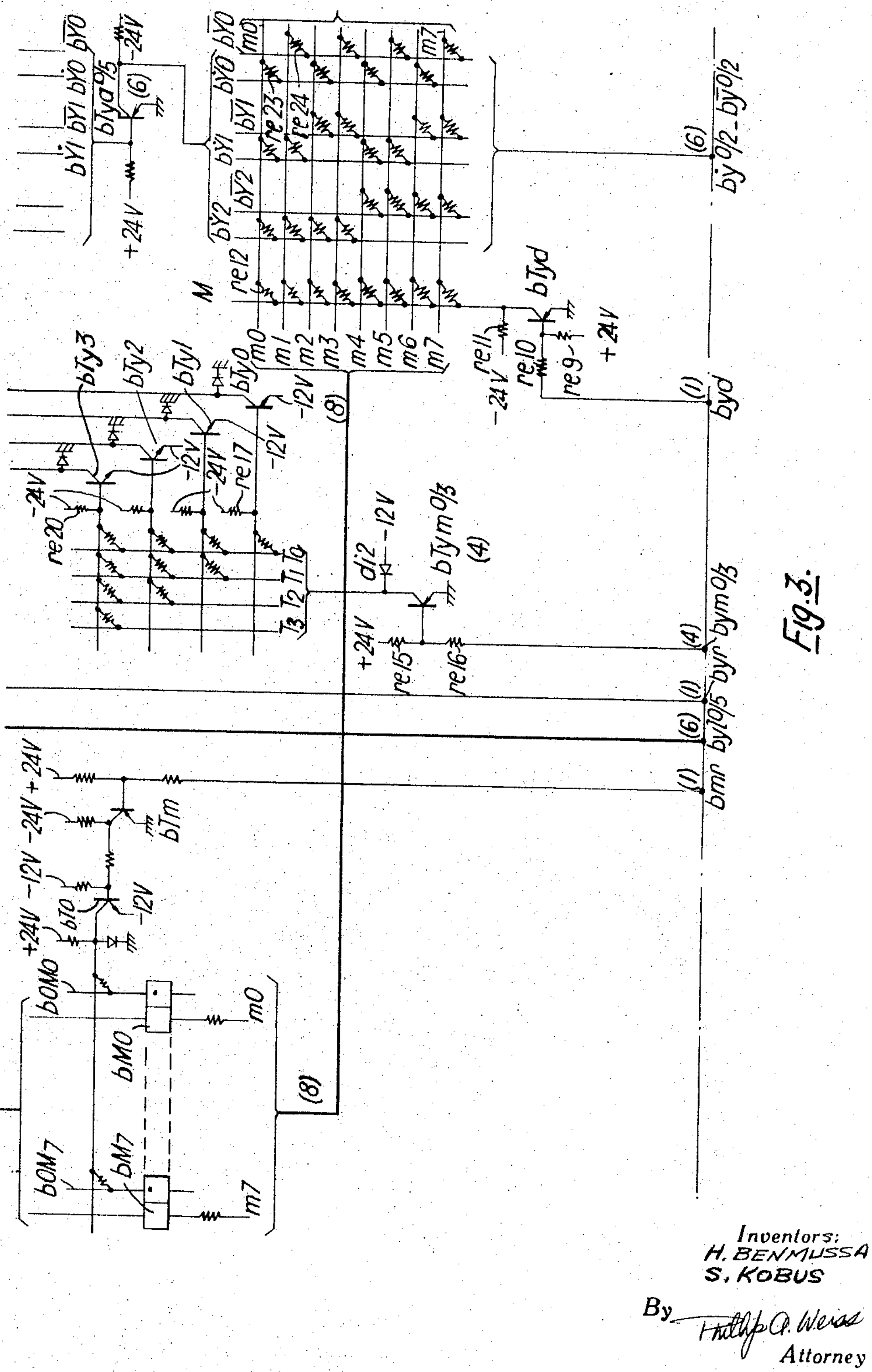
Figure 4:
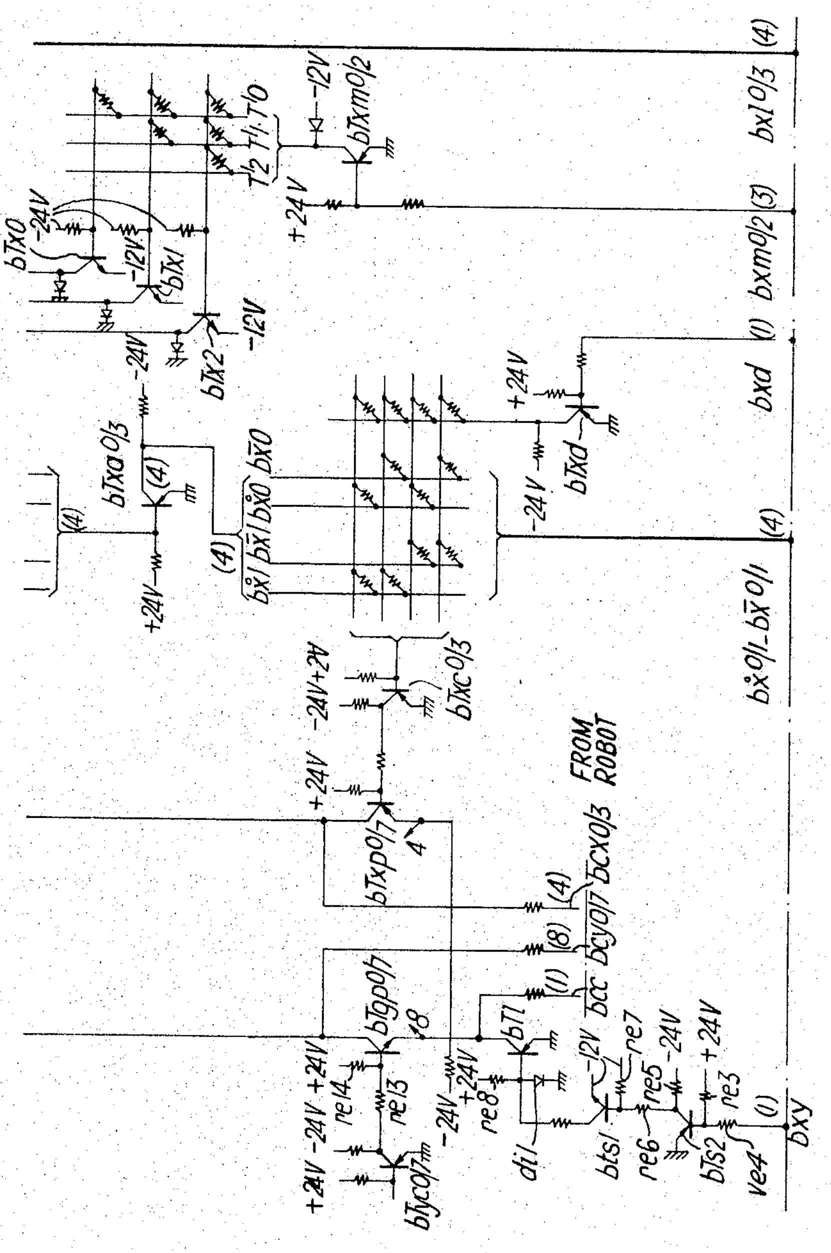
Figure 5:
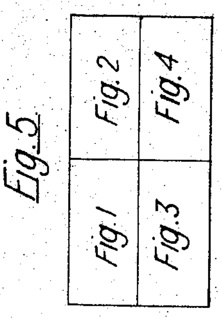
FIGURE 5 shows how FIGURES 1 to 4 should be assembled.

*Binary exclusion device.*—This device uses one output to energize and another output to block. The device is made up of an electronic scanner and of a logic circuit. The scanner, represented in FIGURES 1 to 4 which are assembled as shown on FIGURE 5, is the essential part of the system. It first scans by using the energizing signal to scan the entire lot of units to be tested, then it scans half of this lot of units by using the blocking signal on the half not being scanned, then a quarter, and so on. The logic circuit, placed under the scanner, controls the energizing and blocking signals to put the latter in or out of service. It also tests the units and communicates the result of this test to the scanner. The diagram of the logic circuit has not been represented, since it can easily be realized by those skilled in the art from the description of the present specification.

The units to be tested OI (FIGURE 6) are arranged along four rows comprising each eight units. A wire box is connected to all the units OI of the same row; likewise, a wire *bpy* is connected to the units of a same column. In order to prepare the testing of a given unit, the corresponding wire *bpx* and wire *bpy* are connected to ground. Thus, the selection only necessitates a small number of wires, that is, four wires *bpx* and eight wires *bpy*. On FIGURE 7, which represents a detail of FIGURE 6, there can be seen a resistor *re*1 between each unit OI and the corresponding wire *bpx*, as well as a resistor *re*2 between the said unit and the wire *bpy*. The function of these resistors is to protect the scanner, in FIGURES 1 to 4, against accidental over-voltages.

Figure 2:
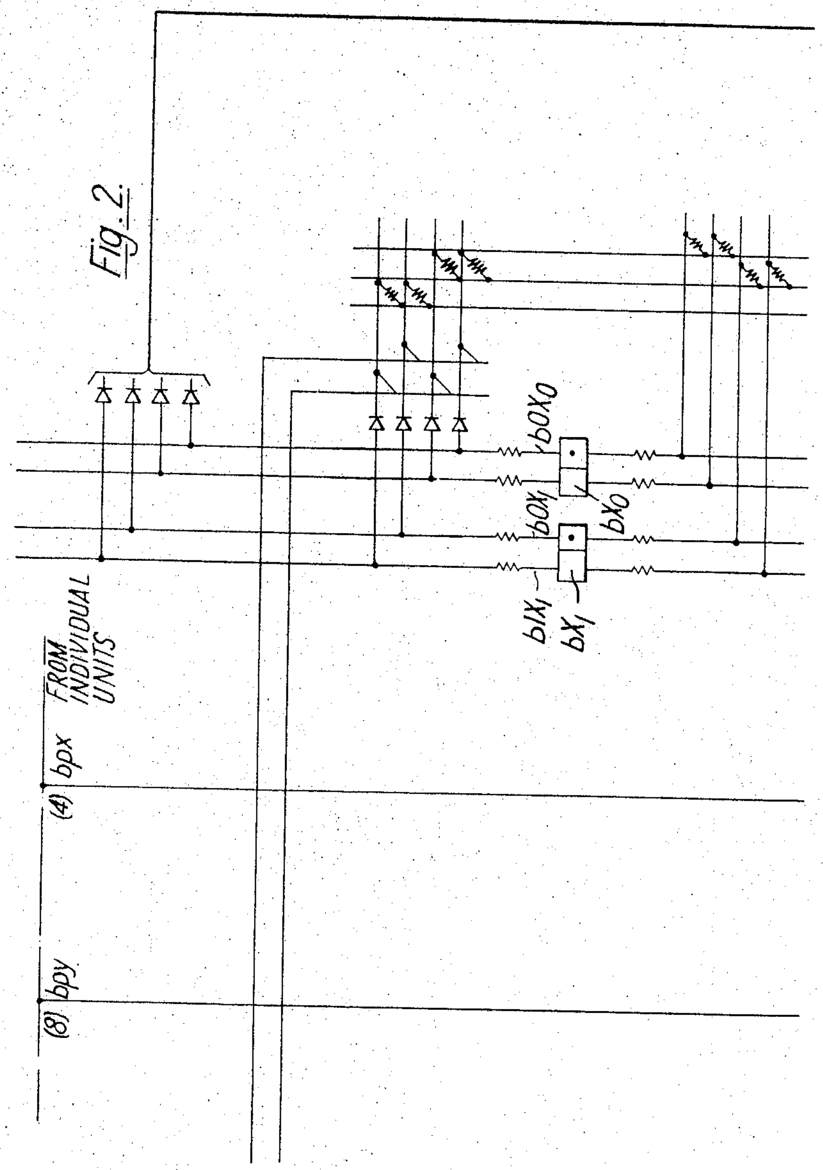

On FIGURE 2 are seen once more the four wires *bpx* and the eight wires *bpy* are again shown.

Normally, that is to say at rest condition, the wires *bxy*, *byd*, *bym*0 . . . *bym*3 are connected to ground through the logic circuit. The transistor *b*T*s*2 (FIG. 4) is blocked by means of a slightly positive potential provided by the voltage divider *re*3, *re*4. The NPN transistor *b*T*s*1, is also blocked by a potential less than −12 v. supplied by the voltage divider *re*5, *re*6, *re*7. Consequently, no current is derived from its collector and the potential of the base of transistor *b*T1 is only fixed by the voltage divider made up of the resistor *re*8 and the diode *di*1. As this potential is slightly positive, the transistor *b*T1 is also blocked; its collector being then at −24 v. potential.

The transistor *b*T*yd* (FIG. 3) is blocked by means of a slightly positive potential supplied by the voltage divider *re*9, *re*10. Due to this, its collector is at the −24 v. potential. This potential is transmitted, through resistors such as *rc*12, onto the base of the eight transistors *b*T*yc*0 . . . *b*T*yc*7 (FIG. 4) which are all saturated. Each one of them delivers, therefore, on its collector, a potential approaching ground; the base of each of the transistors *b*T*yp*0 . . . *b*T*yp*7 (FIG. 4) is brought to a slightly positive potential supplied by the voltage divider *re*13, *re*14. Since the emitter of each one of these transistors is at a −24 v. potential, they are all blocked and do not deliver any current, on outgoing wires *bpy*. It will also be seen that no current is delivered on outgoing wires *bpx*.

The transistors *b*T*ym*0 . . . *b*T*ym*3 (FIG. 3) are blocked by means of a slightly positive potential supplied by the voltage dividers *re*15, *re*16 and do not deliver any current at their collectors. The four transistors *b*T*y*0 . . . *b*T*y*3 are also blocked by means of a −24 v. potential applied onto their base via the resistors *re*17 . . . *re*20 (FIG. 4).

When the device is put into service, wires *bxy, byd, bym*0 . . . *bym*3 are brought to a negative potential by the logic circuit. The transistor *b*T*s*2 saturates and delivers at its collector a potential approaching ground which saturates the next transistor *b*T*s*1. Due to this, the collector of this latter transistor is at a potential of approximately −12 v. The transistor *b*T1 saturates in its turn and delivers at its collector a potential that is approximately ground. The signal furnished by the logic circuit on wire *bxy* is a low power signal; the transistors *b*T*s*2, *b*T*s*1, *b*T*m* (FIG. 3) simply act as amplifiers in order to supply a sufficient current along outgoing wires *bpy* and *bpx* at the moment the units are scanned.

Likewise, the transistor *b*T*yd* (FIG. 3) saturates by means of the negative potential on wire *byd*. It delivers at its collector a ground potential which is sent to the bases of transistors *b*T*yc*0 . . . *b*T*yc*7 (FIG. 4) via the resistors *re*12 (FIG. 3).

The transistors *b*T*ym*0 . . *b*T*ym*3 also saturate by means of the negative potential on wire *bym*0 . . . *bym*3. Thus, they deliver on their collectors a ground potential which saturates the four transistors *b*T*y*0 . . . *b*T*y*3 (FIG. 3). These latter transistors deliver at their collector a −12 v. potential, and thus, the transistors *b*T*ya*0 . . . *b*T*ya*5 (FIG. 3) are all saturated and deliver at their collector a ground potential. The ground is attached to the verticals of matrix M. Since all the resistors of matrix M are connected to the busses of transistors *b*T*yc*0 . . . *b*T*yc*7 (FIG. 4) through the horizontals of the matrix, the transistors are blocked by the ground potential. The −24 v. potential appearing then on their collector, saturates the transistors *b*T*gp*0 . . . *b*T*gp*7; the ground supplied by the amplifier *b*T*s*2, *b*T*s*1, *b*T1 is therefore forwarded simultaneously onto the eight wires *bpy*. Moreover, the ground is forwarded onto the four wires *bpx*. The thirty-two individual units OI are thus scanned at the same time.

The logic circuit tests these units in order to see whether there is at least one which answers to the conditions required. The test circuits have not been represented, since they are not of any interest to the present invention.

If the test proves negative, that is to say if no unit is found which complies to the required conditions, the logic circuit connects the wires *bxy, byd, bym*0 . . . *bym*3 back to ground and the scanner restores to its initial position. In the contrary case, the logic circuit connects only wire *bym*0 back to ground. Due to this, the transistor *b*T*ym*0 gets blocked the transistors *b*T*ym*1 . . . *b*T*ym*3 remaining saturated. The transistor *b*T*y*0 gets blocked as well. Due to that, the −12 v. potential is no longer transmitted by this latter transistor onto the two wires $\overline{bY0}$, $b\dot{Y}0$. From this point on, the potential on these wires depend upon the position occupied by the bi-state $\overline{bY0}$.

Normally, the binary counter *b*C might be in any position whatsoever; but for the purposes of this description assume that it is in position 0, wire $\overline{bC}$ being at −12 v. and wire *b*C being grounded. The −12 v. potential supplied by the transistor *b*T*y*1 is short-circuited by ground on wire *b*C, via the diode *di*8. The −12 v. potential is transmitted through resistor *re*22 onto the inlet at the right of the bistable *b*Y0. The position of the binary counter *b*C (position 0) is therefore copied on the bistable *b*Y0, which provides a −12 v. potential on wire $\overline{bY0}$ and ground on the wire $b\dot{Y}0$. The wires $\overline{bY0}$ and $b\dot{Y}0$ are connected respectively, to transistors *b*T*ya*0 and *b*T*ya*1. The position *b*T*ya*0 is not modified but the transistor *b*T*ya*1 gets blocked. The transistors *b*T*ya*0 . . . *b*T*ya*5 are connected respectively to incoming wires $\overline{bY0}$, *b*Y0, $\overline{bY1}$, $b\dot{Y}1$, $\overline{bY2}$, $b\dot{Y}2$ of matrix M. The transistor *b*T*ya*1 being blocked, the −24 v. potential delivered by its collector is connected to wire $b\dot{y}0$; and from there, the four transistors *b*T*yc*0, *b*T*yc*2, *b*T*yc*4, *b*T*yc*6. These transistors saturate, the corresponding transistors *b*T*yp*0, *b*T*yp*2, *b*T*yp*4, *b*T*yp*6 get blocked, and, half of the wires *bpy* are thus isolated. In such conditions, half of the individual units OI are cancelled; that is to say, those that correspond to the even columns in FIGURE 6.

The logic circuit will then perform a new test of the units remaining in service (those of the odd columns).

If this test proves negative, the half under consideration is cancelled and the other half is put back into service. To do that, the logic circuit sends a −12 v. potential on wire *byr* which makes the binary counter *b*C step to position 1. The position of this counter is copied on the bi-stable *b*Y0, which also passes onto position 1. Due to this, the respective positions of the two transistors *b*T*ya*0, *b*T*ya*1 are reversed. In addition, because of the arrangement of resistors *re*23, *re*24 in the matrix M, half of the individual units left previously in the circuit are blocked; and the other half are put back into service.

If the test is positive, the scanning continues on the half of the network considered. The logic circuit does not send any order on wire *byr*, the binary counter *b*C and the bi-stable *by*) remain in position 0. It applies a ground to wire *bym*1. The transmitter *b*T*my*1 gets blocked and controls in its turn the blocking of the transistor *b*T*y*1. The latter then cancels the −12 v. potential from upon wires $\overline{bY1}$,$b\dot{Y}1$. The potential found along these two wires depend, therefore, only upon position of the bi-stable *b*Y1.

As has been indicated above, the binary counter *b*C is in position 0; the indication of this position is copied on the bistable *b*Y1 according to a process analogous to the one already described about. The wires $\overline{bY1}$ and $b\dot{Y}1$ are respectively at −12 v. and at ground. The transistor *b*T*ya*3, connected to wire $b\dot{Y}1$ gets blocked and delivers a −24 v. potential upon wire $b\dot{Y}1$. Due to this, half of the transistors of group *b*T*yc*0 . . . *b*T*yc*7 are further saturated. The corresponding transistors of group *b*T*yp*0 . . . *b*T*yp*7 are blocked, thus cancelling half of the remaining units. The eight horizontal conductors of matrix M are designated by *m*0 . . . *m*7, the units corresponding to wires *m*0, *m*2, *m*4, *m*6 have already been cancelled at the first test; only those corresponding to wires *m*1, *m*3, *m*5, *m*7 have been kept in use. At the second test, the units corresponding to wires *m*1, *m*5, are cancelled so that only those corresponding to wires *m*3, *m*7 are kept. There is, therefore, a new binary exclusion at each test.

The same process goes on until the selection of one wire *bpy*, and one only, has been performed.

Then, the choosing of a wire *bpx* operates in the same manner.

In the example described here, the selection of a wire *bpy* necessitates three tests; and selection of a wire *bpx*, two tests; which gives a total of five tests for effecting the choice of one unit among thirty-two.

When the selection of a unit is terminated, the logic circuit takes note of the position of the bistables *b*Y0, *b*Y1, *b*Y2 by means of the potentials found on wires $\overline{by0}$ . . . $\overline{by2}$, $b\dot{y}0$ . . . $b\dot{y}2$. Furthermore, it takes note of position of the bistables *b*X0, *b*X1, by means of the potentials found on wires $\overline{bx0}$, $\overline{bx1}$, $b\dot{x}0$, $b\dot{x}1$.

After having recorded this information it connects the various wires *bxy, byd, bym*0 . . . *bym*3 back to ground; the scanner then returns to its rest condition.

Figure 1:
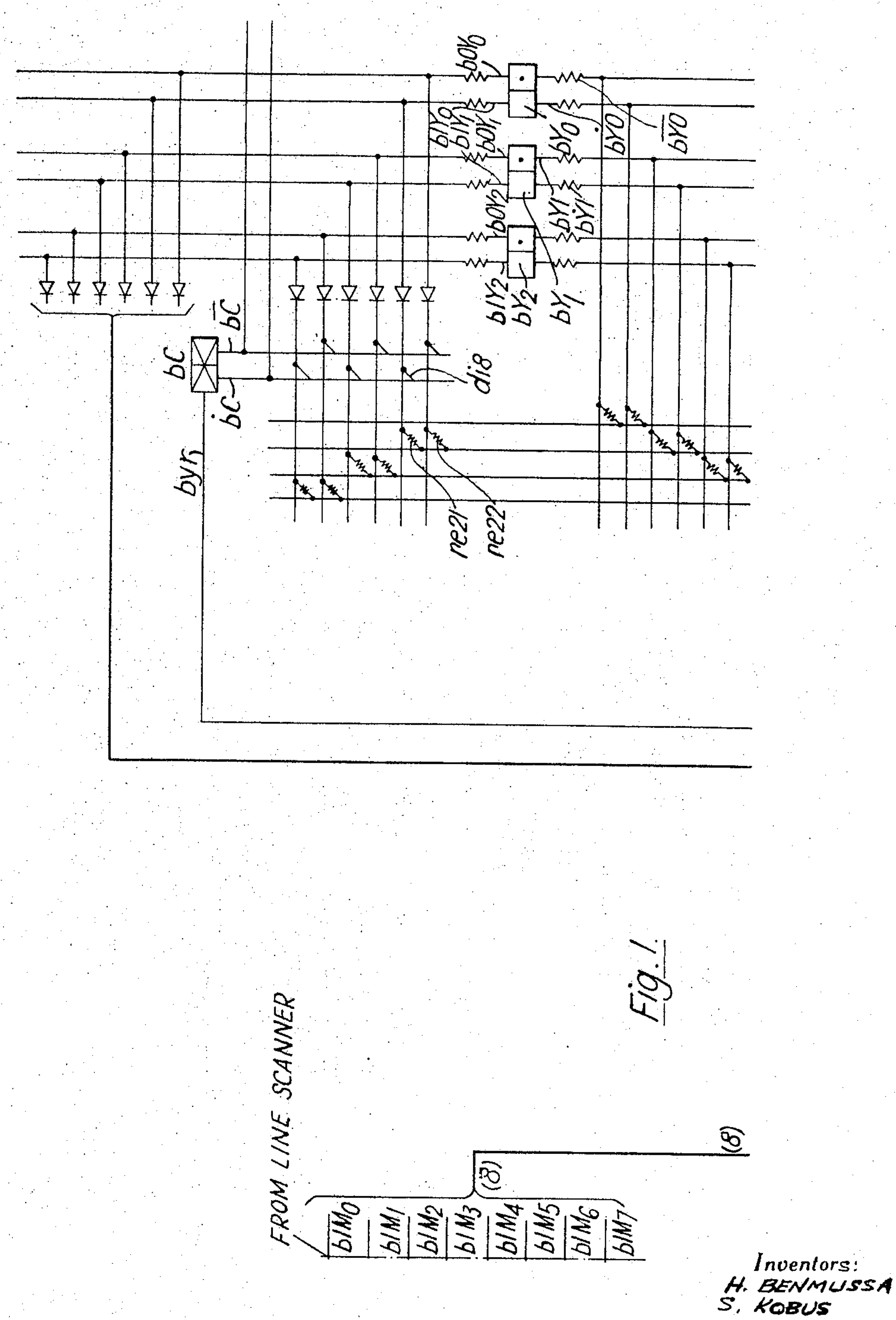
FIGURES 1 to 4 show a diagram of the binary exclusion device that is an object of the present invention.

*Various and particular cases.*—It is possible to prohibit the choosing of any certain group of units OI. Thus, for instance, to cancel the units of column 0 in the matrix shown on FIGURE 6, a negative potential is applied by any adequate means onto wire *b*1M0 (FIGURE 1). The wires *b*1M0 . . . *b*1M7 are connected respectively onto the left inlets of bistables *b*M0 . . . *b*M7. The bistable *b*M0, having its left inlet at a negative potential, passes to position 1; wire *m*0 is then at the −12 v. potential. Due to this, the transistor *b*T*yc*0 is saturated permanently, and the corresponding units are cancelled.

In order to restore the bistable *b*M0 to its rest condition, the logic circuit applies a negative potential to wire *bmr*, and that saturates the normally blocked transistor *b*T*m*. This transistor delivers a potential approaching ground, and that saturates the next transistor *bt*0, normally blocked. Finally, this latter transistor sends a −12 v. potential to the right inlet of bistable *b*M0, which restores the latter to position 0.

In some cases, it might be important to have the test performed upon a determined unit. For that purpose, the logic circuit will directly position the bistables *b*Y0, *b*Y1, *b*Y2 by means of wires *by*10 . . . *by*15. Moreover, it positions the bistables *b*X0, *b*X1 by means of wires *bx*10 . . . *bx*13.

The diodes *di*2, (FIG. 3) placed near the transistors *b*T*ym*0 . . . *b*T*ym*3, perform a protection function. In the case where the potential of the collector of one of these transistors goes below −12 v. for some accidental reason, the diode *di*2 conducts to prevent this potential from going any lower. The diodes placed near the transistors *b*T*y*0 . . . *b*T*y*3, *b*T*x*0 . . . *b*T*x*2 perform similar functions.

The collectors of transistors *b*T1, *b*T*yp*0 . . . *b*T*yp*7, *b*T*xp*0 . . . *b*T*xp*3 are connected to a checking device or "supervision robot," through wires *bcc, bcy*0 . . . *bcy*7, *bcx*0 . . . *bcs*3. The value of the potential found on wire *bcc* indicates to the "supervision robot" whether the scanner is in or out of service. After the selection of a unit, the robot must find ground on only one of the wires *bcy*0 . . . *bcy*7 and on only one of the wires *bcx*0 . . . *bcx*3. In the contrary case, there is mistake, and the robot transmits an appropriate alarm signal.

Figure 8:
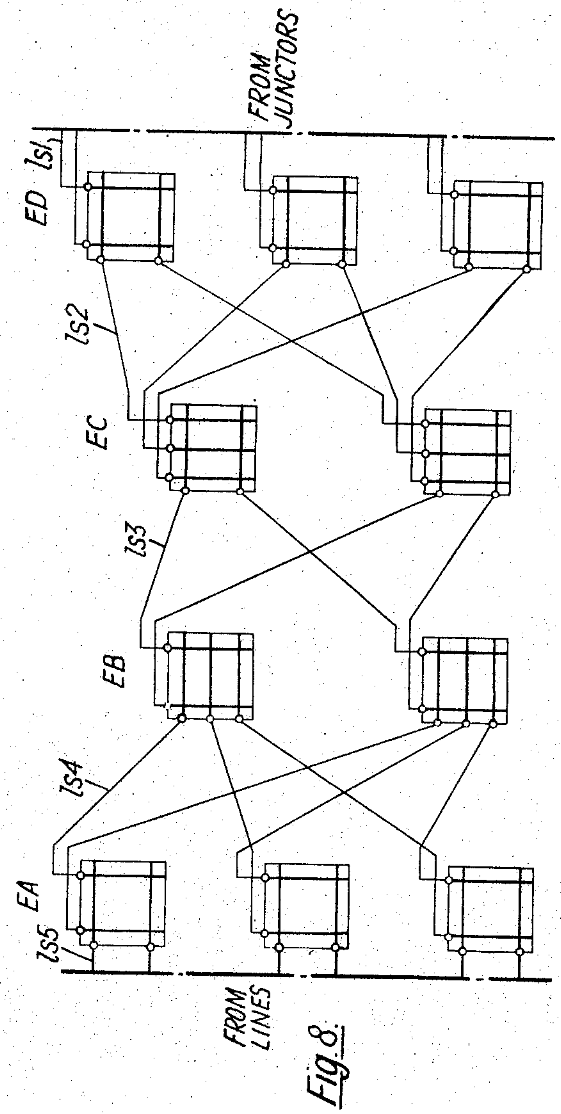
FIGURE 8 is a diagram of the connection network of a semi-electronic telephone system making use of a binary exclusion device.

*Application to the piloting circuit of a semi-electronic telephone system.*—The connection network used in such a system is shown on FIGURE 8. This network can connect, on one hand, junctors (local junctors or feeders, outgoing junctors, incoming junctors) and, on the other hand, subscribers. Starting with the junctors, there is found in succession: a stage of primary selection ED, a secondary stage EC, a tertiary stage EB and a terminal stage EA. The selectors, shown schematically by thick vertical strokes, are always placed on junctor side; the outlets, represented by horizontal strokes, are always placed on subscriber's side. The entire set of selectors, having access to the same outlets, make up a "section."

The selectors of a same section are grouped in a square drawn in thin lines in the figure. In the case of stages ED, EC, EB, the selectors of a section are generally assembled in one case or "frame"; whereas, in the terminal stage EA, each one of the frames contains several sections.

As is seen from an examination of the figure, any section of stage ED is connected, as far as possible, to different sections of stage EC. The same procedure applies to the links between the following stages: EC, EB, EA, and that provides a maximum accessibility between junctors and subscribers. A unique feature of this circuit is the use of a link between two determined sections belonging to two consecutive stages. Thus, without any ambiguity a routing path can be determined between a junctor and a subscriber if the following are known: the rank of the primary selector in the section, the number of the section in each stage, and the rank of the outlet upon the bank of the terminal selectors. So that for instance, if the selector of rank 1 counted from the right in stage ED and the sections No. 1 counted from the top in each stage, and, the outlet of rank 1 in the terminal stage are all selected; the routing path would be as follows: link 1*s*1, selector and outlet of stage ED (section 1), link 1*s*2, selector and outlet of stage EC, link 1*s*3, selector and outlet of stage EB, link 1*s*4, selector and outlet of stage EA, link 1*s*5. The function of the checking and control circuit or "marker" is therefore to determine these various elements.

Figure 9:
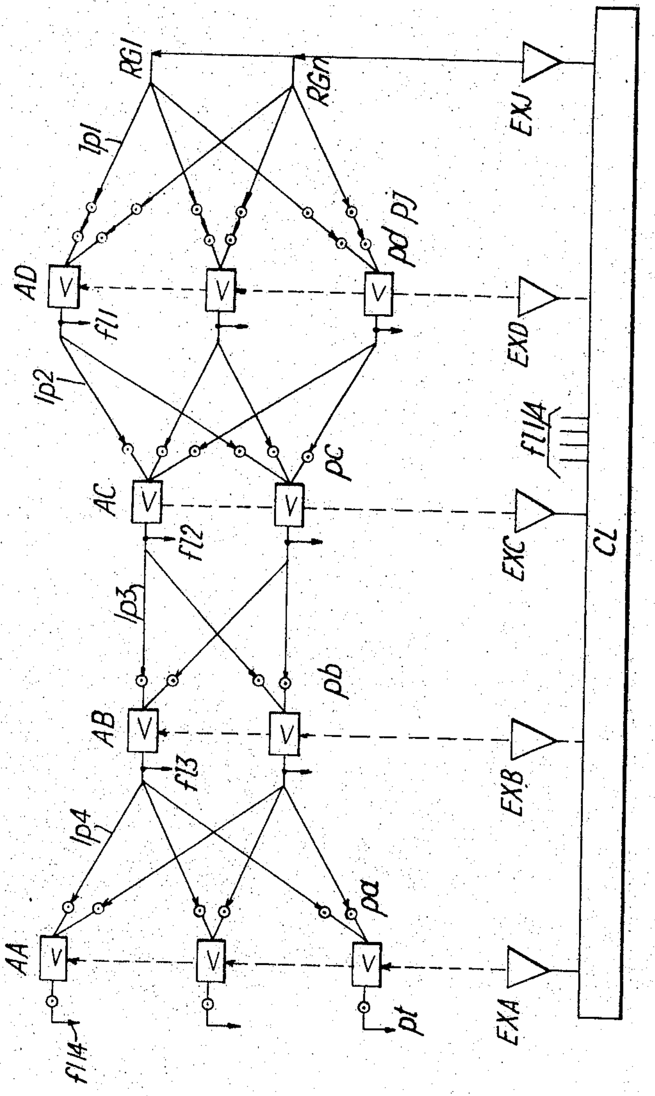
FIGURE 9 is a diagram of the piloting network of the semi-electronic system in FIGURE 8.

The pilot network in FIGURE 9, used for determining a routing path, possesses a configuration analogous to the one of the connection network. An amplifier AD corresponds to each section of the primary stage ED; likewise, an amplifier AC corresponds to every section of the stage EC, an amplifier AB corresponds to every section of the stage EB and, finally, an amplifier AA corresponds to every section of the terminal stage EA. For each link of the connection network there is a link 1*p* in the pilot network. More specifically, the outlet of an amplifier AD is connected to the inlets of the amplifiers AC via "AND" gates *pc* rendered conductive only when the corresponding selectors of stage EC are available. The state of each selector of stage EC (free or busy) is therefore manifested by the state of a gate *pc* (conductive or blocked). The links between the amplifiers of the next stages AC, AB, AA are arranged according to a similar process. On the links which end up upon the inlets of the amplifiers AD, there are two gates *pd* and *pj*; the gate *pd* is conductive if the corresponding primary selector is available; the gate *pj* is conductive when it is required to mark the junctor associated with this selector. Thus, for instance, in the case of a local call, all the local junctors or available feeders are marked; in the case of an outgoing call, only the junctors associated with the circuits of the numbered direction are marked. The links corresponding to the primary selectors which occupy the rank 1 in their sections are multipled upon a same common point RG1; likewise, the links corresponding to the primary selectors of rank *n* are multipled upon a common point RG*n*.

The various common points RG1 . . . R*gn* are scanned by a scanner EXJ which supplies them with the piloting current. The various primary sections AD are scanned by a scanner EXD which can block all or part of them. Likewise, the amplifiers AC, AB, AA are scanned respectively by the scanners EXC, EXB, EXA. All those scanners are of the binary exclusion type and can be constructed as indicated in the foregoing descriptions.

The logic circuit CL emits the piloting current via scanner EXJ and checks the reception of this current at the output of the amplifiers of each stage. In order to perform this checking, some circuits such as *fl*1 . . . *fl*4 connect the outputs of each amplifier onto the logic circuit.

The pilot circuit operates in the following way: the junctors corresponding to the required direction are marked by opening the associated gates *pj*; at the other end of the circuit, the terminal sections serving the subscriber are marked by opening the associated gates *pt*. The scanner EXJ is connected to all the outlets at the same time, as are all the other scanners EXD, EXC, EXB, EXA. The logic circuit CL then emits the pilot current through the scanner EXJ. Thus, this current is transmitted through all the available routing paths, form the common points RG1 . . . RG*n* up to gates *pt* associated with the terminal sections. The logic circuit CL first determines whether the pilot current reaches the outlet of gate *pt*. In the affirmative, it concludes that there exists at least one routing path available among one of the marked junctors and one of the terminal sections having access to the subscriber.

One available path is then chosen, among all the possible paths. The piloting current is always emitted through the scanner EXJ and received on all or part of the wires *fl*4 placed at the outlet of the amplifiers AA. If piloting current is no longer received at the outputs of the amplifiers AA which have remained conductive, the cancelled amplifiers are put back into service so as to put the others out of circuit. In the contrary case, the scanning is carried on by eliminating half of the remaining amplifiers. One amplifier AA, and one only, is therefore rapidly isolated and thus, a terminal section is determined.

The piloting current is still emitted through the scanner EXJ, that is to say on the upline side. The same process is undertaken with the scanner EXB by effecting the test upon wire *fl*4 corresponding to the chosen amplifier AA. Thus, a tertiary section is selected, having access to the chosen terminal section; while being sure that there exists at least one available routing path between the said tertiary section and one of the marked junctors on the upline side, since the piloting current always originates from upline point. The piloting current flows permanently from the upline side onto the tertiary sections. Each test only takes the propagation time through a link 1*p*4; its duration is therefore minimal.

The same is done with scanner EXC, for the choosing of a secondary section, by performing the test upon wire *fl*3 corresponding to the chosen amplifier AB.

Thus, the operation is carried closer and closer to the other end of the pilot network. The routing path is in this way determined without any ambiguity.

From the above explanation, it is seen that the routing path has been determined only up to the terminal path inclusive. Means, not shown here, enable the system to determine the rank of the subscriber upon the banks of the terminal section and thus, to control the setting into place of the terminal stage.

Figure 10:
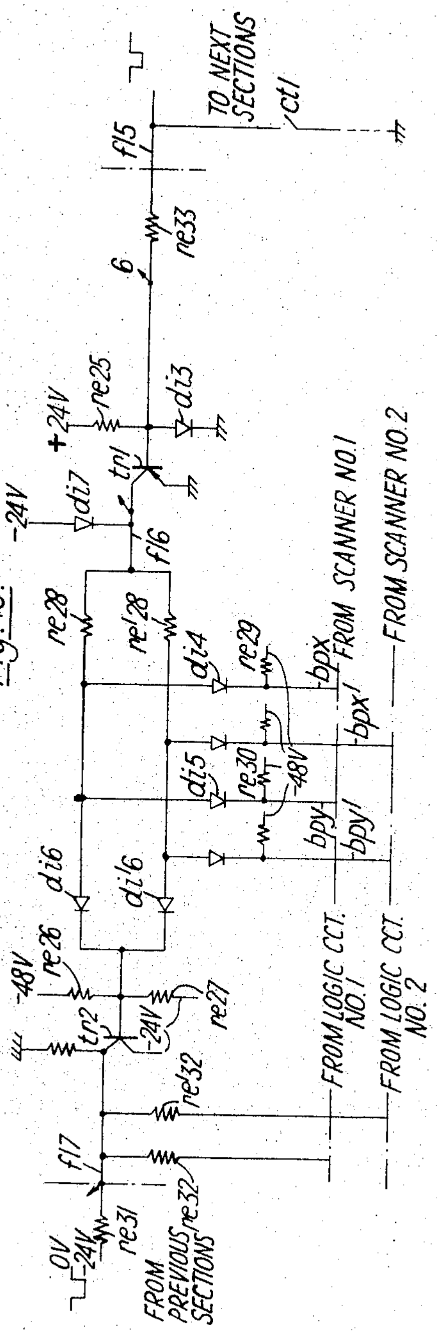
FIGURE 10 is a diagram of a piloting amplifier.

The diagram of a pilot amplifier is shown on FIGURE 10. Normally, that is to say at the rest condition, the transistor *tr*1 is blocked by means of a slightly positive potential supplied by voltage divider made up of the resistor *re*25 and the diode *di*3. The NPN transistor *tr*2 is also blocked by means of a potential less than —24 v. The potential is obtained by means of the voltage divide *re*26, *re*27. The pilotting current is received, under a —24 v. voltage, on incoming wire *fl*5 corresponding to a determined selector. If this selector is free, the contact *ct*1 is open and the pilot signal can reach the base of the transistor *tr*1. If the selector is busy, the contact *ct*1 is closed, and that short-circuits the piloting signal.

The links *fl*5 corresponding to the selectors of a same section are grouped in groups of six, so as to end up upon a same transistor *tr*1; the various transistors *tr*1 of the section are multipled upon a single wire *fl*6. At the reception of the piloting signal, the transistor *tr*1 saturates and delivers on its collector a ground potential. When the scanner is not orientated onto the considered amplifier, the wires *bpx* and *bpy* are isolated; thus, the signal delivered by the transistor *tr*1 is absorbed through the two following circuits:

(1) Wire *fl*6, resistor *re*28, diode *di*4, resistor *re*29, —48 v. potential;

(2) Wire *fl*6, resistor *re'*28, diode *di*5, resistor *re*30, —48 v. potential.

Figure 6:
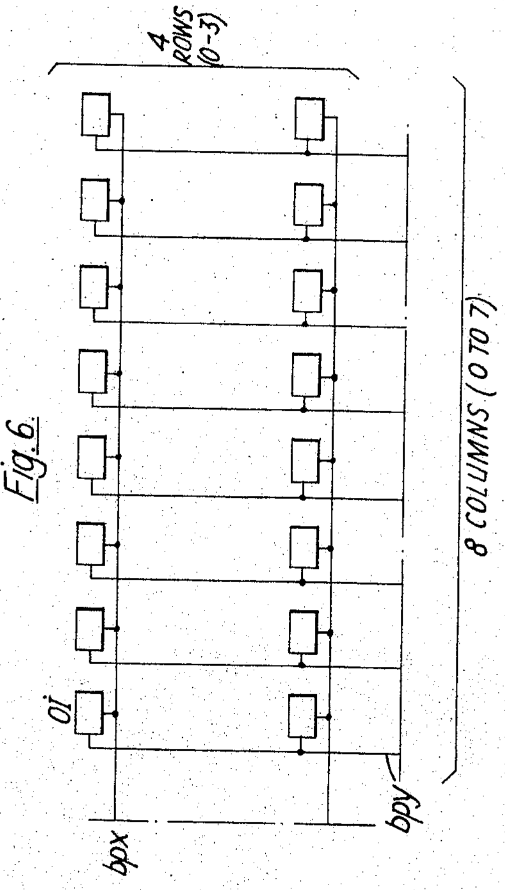
FIGURE 6 shows how the units to be tested are assembled according to rows and columns.
Figure 7:
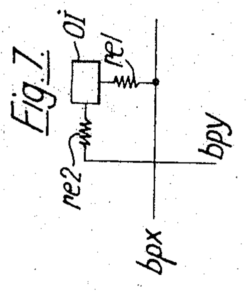
FIGURE 7 is a detail of FIGURE 6 relating to the utilization of protection resistors.

As was indicated in the description of FIGURE 6, the scanner focuses to an individual unit by grounding simultaneously, the wires *bpx* and *bpy* with which it is associated. When such is the case, the signal delivered by the transistor *tr*1 is no longer absorbed in the resistors *re*29, *re*30, but spreads onto transistor *tr*2 through diode *di*6. The transistor *tr*2 saturates and delivers on its collector, that is to say on the outgoing wire *fl*7, a —24 v. signal. Therefore, at the output of the amplifier a signal is found which has the same polarity as the one received at the input. The wire *fl*7 is multipled, via resistors *re*31, onto all the sections of the next stage accessible to the section under consideration. The logic circuit can gather the amplified signal through the resistor *re*32.

The selection of a routing path is very rapid, it is possible to handle all the traffic of an important exchange by means of a single arrangement made up of the logic circuit CL (FIGURE 9) and the scanners EXJ, EXD, EXC, EXB, EXA. However, two identical arrangements are provided for reliability purposes in order to prevent the breakdown of the entire exchange if one of them is out of order. Whereas, the various units of the pilot circuit, in particular the amplifiers AD, AC, AB, AA, are not doubled since each one of them controls only a single section. Thus, a same amplifier is scanned by two identical scanners. To enable these two scanners to operate upon this amplifier without hindering each other, the linking circuit has been doubled between the stages *tr*1, *tr*2 (resistor *re'*28, diode *di'*6), as well the the access circuits (wires *bpx'*, *bpy'*). In order that the pilot signal be transmitted between the transistors *tr*1 and *tr*2, it is just necessary that one of the two scanners be coupled to the considered amplifier by grounding the two corresponding access wires. The logic circuit No. 2 may gather the amplified signal through resistor *re'*32.

The diode *di*7 of FIG. 10 performs a protection function as already indicated with regard to certain diodes in the detailed description of the scanner.

Instead of marking the busy condition of a selector by the closure of a make contact *ct*1, it is possible to insert a break contact on wire *fl*5; this contact is closed when the selector is available. In operating as indicated on FIGURE 10, many interesting results are obtained. In the case where a break contact is used in series on wire *fl*5, the corresponding selector is marked "busy," artificially whenever this contact is dirty; the selector, therefore, is never seized and no means are available to spot the breakdown. In the case of FIGURE 10, a free selector is seized even if the contact *ct*1 is dirty, since the availability corresponds to the open contact; it is then possible to perform checkings in order to spot the breakdown, by sending for instance a pilot signal from a section chosen in a stage, onto the section chosen in the next stage. Normally, the signal must not pass, since the gate inserted upon the corresponding path is blocked. If things are otherwise, then there must be something out of order (contact *ct*1 is dirty or has not operated correctly).

Moreover, in practice, the junctors can be situated at a spot distant from the selectors. In marking the busy condition of a junctor by a break contact, it is essential to put through two wires between the selector and the junctor. On the contrary, if the busy condition of a junctor is marked by a make contact associated with a diode, only a single wire is enough.

Figure 11:
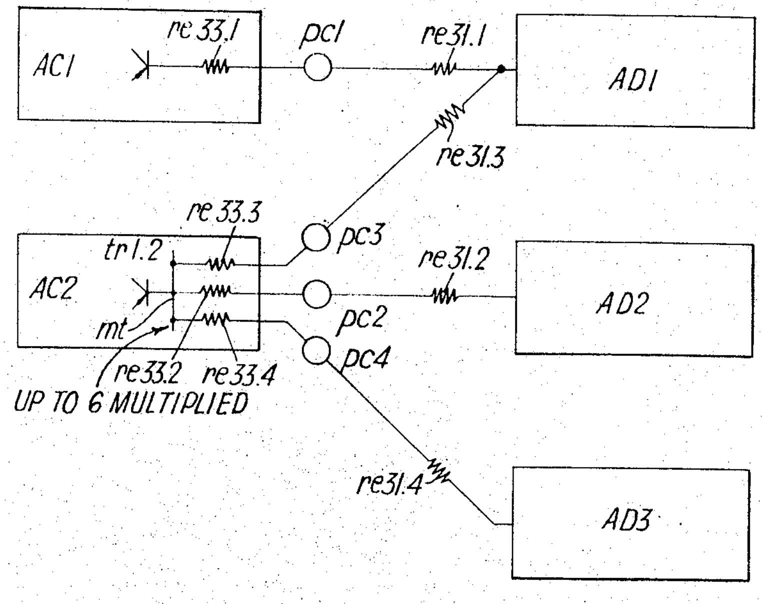
FIGURE 11 illustrates in detail the piloting network used to explain the method of avoiding minglings.

On FIGURE 11 are shown three amplifiers of the primary stage AD1, AD2, AD3, and two amplifiers of the secondary stage AC1, AC2. When the link between the sections AD1 and AC1 is available, the gate *pc*1 is conductive, the pilot signal is then transmitted from AD1 onto AC1 through; resistor *re*31.1, the gate *pc*1 and resistor *re*33.1. But if there is not any link available between AD2 and AC1, an untimely signal may be transmitted from AD2 onto AC1 through the following circuit: resistor *re*31.2, gate *pc*2, resistor *re*33.2, common point *mt* resistor *re*33.3, gate *pc*3, resistor *re*31.3, resistor *re*31.1, gate *pc*1. Moreover, amplifier AD3 can transmit an untimely signal onto AC1 through: resistor *re*31.4, the gate *pc*4, resistor *re*33.4 and the common point *mt*. These various untimely signals arrive weakened at the amplifier AC1, since they travel along a way having three times the resistance; but, a plurality of signals even weakened, would risk causing the untimely operating of AC1. In order to avoid this drawback, the number of links which end up upon the base of transistor *tr*1.2 in the amplifier AC2 is limited. Practically speaking, only six links are multipled, as was specified in the description of FIGURE 10.

The unique operation of scanners EXB and EXA (FIGURE 9) is to be noted. As has been mentioned, a frame of the terminal stage contains several sections, a given subscriber being only served by just a part of them. Thus, for instance, a terminal frame may contain eight sections, among which only two give access to the required subscriber. By every adequate means, information is sent onto the scanner EXB informing it of the rank inside the frame of the terminal section serving the subscriber. The scanner EXB is then able to eliminate all the tertiary sections which give access to the terminal sections of another rank. The function of the terminal scanner EXA gets simplified; in each frame, it limits itself to effect a choice amongst the two sections serving the required subscriber. From a practical point of view, this arrangement enables the system to realize less costly terminal scanners, of much lesser volume. If the diagram in FIGURES 1 to 4 is referred to, it is seen that a certain number of tertiary sections can be cancelled by applying a negative potential onto some of the wires *b*1M0 . . . *b*1M7, which thus inhibits, as was explained above, the selection of some of the wires *bpy*. In the example which has been given above, it is essential to cancel six sections out of eight; this is performed by applying the negative potential onto six of the wires *b*1M0 . . . *b*1M7.

While the principles of the invention has been described above in connection with specific apparatus and applications, it is to be understood that this description is made only by way of example and not as a limitation on the scope of the invention.

We claim:

1. In an automatic telephone switching system comprising a switching network for extending communication paths between inlets and outlets of said system, lines connected to said inlets and junctors connected to said outlets, pilot network means comprising circuitry analogous to the circuitry in said switching network for controlling the extension of said paths, means responsive to a calling condition on one of said lines for marking said one line and all available ones of said junctors in said system and in said pilot network, binary exclusion means in said pilot network, said binary exclusion means comprising scanning means for scanning said inlets and said outlets, said logic means operated responsive to said scanning means for transmitting path finding signals through all available paths in said pilot network, decoding matrix means in said scanning means for controlling the transmission of said signals in said pilot network, means in said decoding network means for controlling the transmission of blocking signals through said pilot network for successively blocking fractional portions of said pilot network until only one path is selected, means responsive to the failure to receive said signals for unblocking the last fractional portion blocked and blocking a successive fractional portion until only one path is selected through said network, and means responsive to selecting said one path for switching through a path in said switching network analogous to said selected path in said circuit network.

2. In the automatic telephone switching system of claim 1 wherein said decoding network means is controlled by bistable circuitry whereby path finder signals are sent through said decoding matrix means to said pilot network responsive to a first stable state of said bistable circuitry and said path finding signals are cancelled by an opposite potential signal responsive to said bistable control circuitry being in the second stable state.

3. In the automatic telephone switching system of claim 2 wherein said switching network comprises a plurality of stages of crossbar switches, link means connecting said stages, amplifier means in said pilot network for simulating said link means and said crossbar switches in each of said stages and first gate means in said pilot network for simulating the busy condition of each path through said switching network.

4. In the automatic telephone switching system of claim 3 wherein said first gate means comprise diode means.

5. In the automatic telephone switching system of claim 3 wherein means are provided for multipling all the verticals of the crossbar switches in each stage to a common link and second gate means in said pilot network for simulating said multipled verticals.

6. In the automatic telephone switching system of claim 5 and third gate means associated with said inlets and outlets operated to mark said associated ones of said inlets and outlets.

7. In the automatic telephone switching system of claim 6 wherein said scanning means comprises individual scanners for each of said stages in said switching network.

References Cited

UNITED STATES PATENTS 3,226,486 12/1965 Benmussa et al. ---- 179—18.7

KATHLEEN H. CLAFFY, *Primary Examiner.*

L. A. WRIGHT, *Assistant Examiner.*